United States Patent [19]

Teufel et al.

[11] Patent Number: 5,666,941
[45] Date of Patent: Sep. 16, 1997

[54] SWING-OUT SIDE TABLE FOR BARBECUE GRILL

[75] Inventors: Rainer B. Teufel, Colombus, Ohio; Michael Giebel, Joplin, Mo.; Steven Speck; Michael Franks, both of Neosho, Mo.

[73] Assignee: Sunbeam Products, Inc., Delray Beach, Fla.

[21] Appl. No.: 290,424

[22] Filed: Aug. 15, 1994

[51] Int. Cl.⁶ ........................................ A47J 37/00
[52] U.S. Cl. .................. 126/41 R; 126/25 R; 126/9 R; 126/50; 126/276
[58] Field of Search ................... 126/41 R, 39 R, 126/40, 9 R, 50, 9 B, 25 R, 30, 276; 99/357, 339, 340, 449, 422, 425

[56] References Cited

U.S. PATENT DOCUMENTS

| | | |
|---|---|---|
| D. 255,639 | 7/1980 | Cox . |
| D. 293,067 | 12/1987 | Stephen et al. . |
| D. 325,318 | 4/1992 | Parent et al. . |
| D. 326,207 | 5/1992 | Koziol . |
| 2,960,979 | 11/1960 | Stone ........................ 126/30 X |
| 3,091,343 | 5/1963 | Neumann ..................... 126/25 R |
| 3,094,113 | 6/1963 | Avila ............................. 126/30 |
| 3,230,948 | 1/1966 | Schmitt ....................... 126/25 R |
| 4,054,123 | 10/1977 | Carter ..................... 126/25 R X |
| 4,665,888 | 5/1987 | Christen, Jr. et al. . |
| 4,856,423 | 8/1989 | Burns ........................ 126/30 X |
| 4,896,651 | 1/1990 | Kott, Jr. ........................ 126/30 |
| 4,955,358 | 9/1990 | Harris et al. . |
| 5,016,607 | 5/1991 | Doolittle et al. . |
| 5,072,718 | 12/1991 | Seal . |
| 5,109,834 | 5/1992 | Collins et al. . |
| 5,220,764 | 6/1993 | James . |

Primary Examiner—Larry Jones
Attorney, Agent, or Firm—Michael J. Kline; Charles E. Kosinski

[57] ABSTRACT

A side table for a barbecue grill, comprising: a table member and means for rotatably supporting the table member on a vertical leg of the barbecue grill such that the table member is rotatable in horizontal plane about the vertical leg.

14 Claims, 3 Drawing Sheets

SWING-OUT SIDE TABLE FOR BARBECUE GRILL

FIELD OF THE INVENTION

The present invention relates to auxiliary side tables for gas-fired barbecue grills and, more particularly, to an improved side table capable of rotational movement about a support leg of the barbecue grill between a storage position and an operative position.

BACKGROUND OF THE INVENTION

Conventional gas-fired grills consist of a main grill compartment containing a gas burner positioned beneath a fire grate which supports briquettes such as lava rocks. A cooking grid on which food to be grilled is suspended above the briquettes, and heat from the burning gas is transferred to the briquettes which provides radiant heat for cooking food on the grid. Generally, the grill compartment is supported on a cart assembly that also supports a side table on either or both sides of the grill compartment. Alternatively, the cart assembly may support an auxiliary side burner in lieu of one of the side tables. It is often the case that the user of the gas grill is cramped for work space in which to prepare the barbecued meal, particularly where the grill cart assembly has only one side table.

Attempts have been made in the prior art to provide working surfaces for the user of the gas grill. See, for example, the following U.S. patents which disclose either stationary side tables or side tables which are moveable about a horizontal axis:

U.S. Pat. No. 5,016,607 to Doolittle et al; U.S. Pat. No. 4,665,888 to Christen, Jr., et al.; U.S. Pat. No. D 4,326,207 to Koziol; and U.S. Pat. No. D 325,318 to Parent et al.

While those prior art grills do provide working surfaces in connection with the grill cart assembly of a barbecue grill, an improved side table capable of rotational movement about a vertical axis between a storage position and an working position is desirable. Accordingly, it is a principal object of this invention to provide such a new and improved side table.

Another object of the present invention is to provide such an articulating side table which can be mounted on existing barbecue grills.

Yet an additional object of the present invention is to provide an auxiliary side table that may be stored underneath the body of the grill or below a stationary side table mounted to the grill.

SUMMARY OF THE INVENTION

In accordance with the present invention, there is provided a swing-out side table for a gas-fired grill which has a source of gaseous fuel and a housing having a front wall opposite to a rear wall and two opposing side walls defining a main gas burner compartment supported by at least three vertical legs. The swing-out side table comprises a table member and means for rotatably supporting the table member on a vertical leg of the barbecue grill such that the table member is rotatable in horizontal plane about the vertical leg on which it is supported. In a preferred embodiment of the present invention, the means for rotatably supporting the table member on a vertical leg of the grill cart comprises a collar formed as an integral part of a side of the table member and projections on the leg. The collar has an inside diameter which is larger than the outside diameter of the vertical leg and can be slid over a leg having circular cross-section. A projection on the leg positioned below the collar support the side table at the desired height on the leg. In addition, the collar may have a slot in its inside surface which receives another projection on the leg to rotatably support the side table.

Further, means are provided for restricting the rotational movement of the side table to a predetermined angular range about the leg. Also, the collar may be adapted to be fit over legs of various cross-sectional shapes, such as an oval or polygon including, but not limited to, a rectangle, square or hexagon, etc.

These and other features and advantages of the preferred embodiments of the present invention will become readily apparent from the following detailed description of the preferred embodiments, the claims appended hereto, and from the accompanying drawings illustrating the preferred embodiments of the present invention.

BRIEF DESCRIPTION OF THE DRAWINGS

In the accompanying drawings, the preferred embodiments of the invention are illustrated in which.

DETAILED DESCRIPTION OF THE PREFERRED EMBODIMENTS

Figure 1:
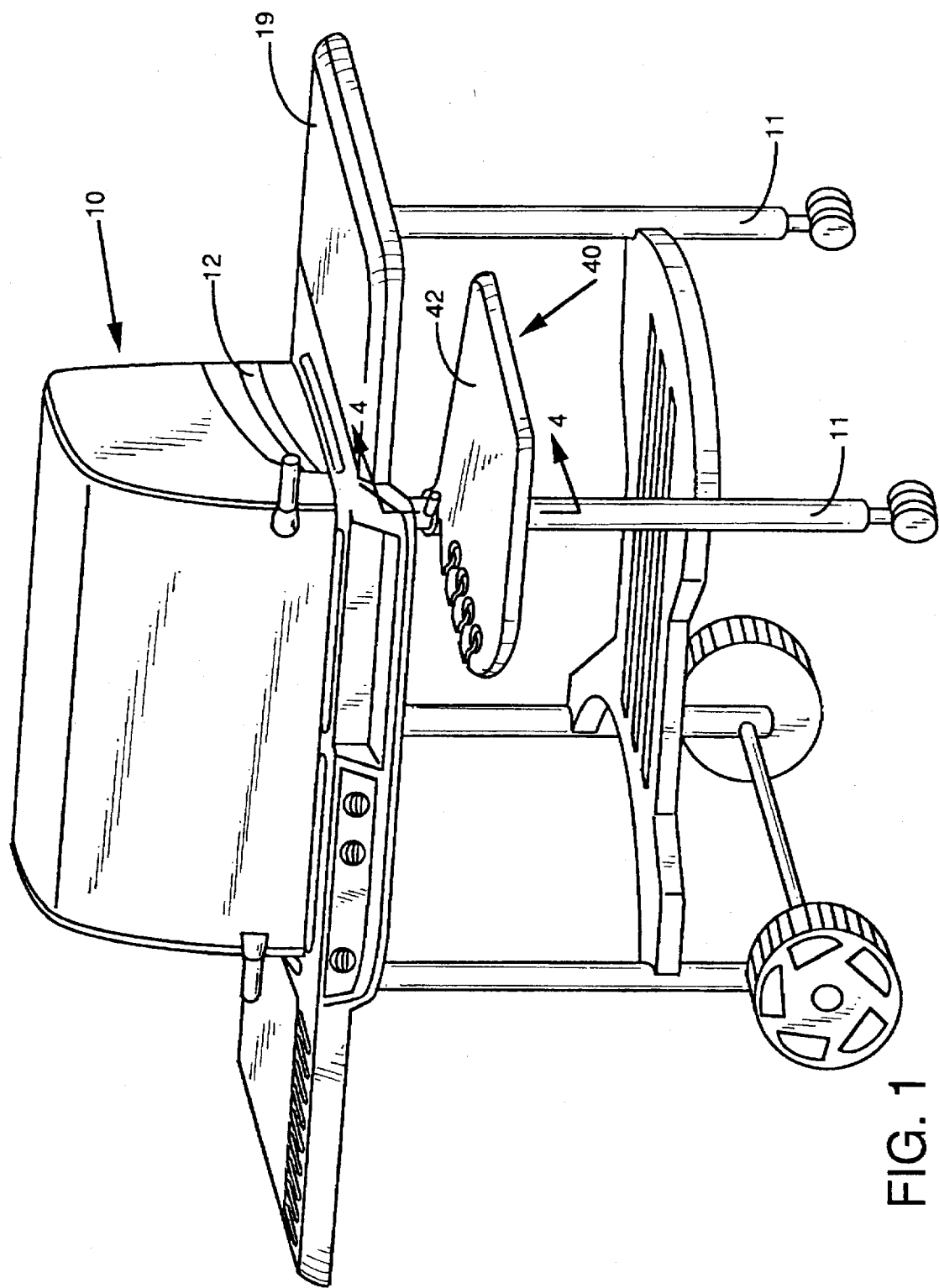
FIG. 1 is a front perspective view of the swing-out side table of the present invention shown mounted to a gas-fired barbecue grill.

FIG. 1 shows a gas-fired barbecue grill 10 having a main grill compartment 12 supported by tubular legs 11 having a circular cross-section. Barbecue grill 10 has mounted thereto a stationary side table 19. As shown in FIG. 1, swing-out side table 40 is rotatably supported on a vertical leg 11 of grill 10 below stationary side table 19.

Figure 2:
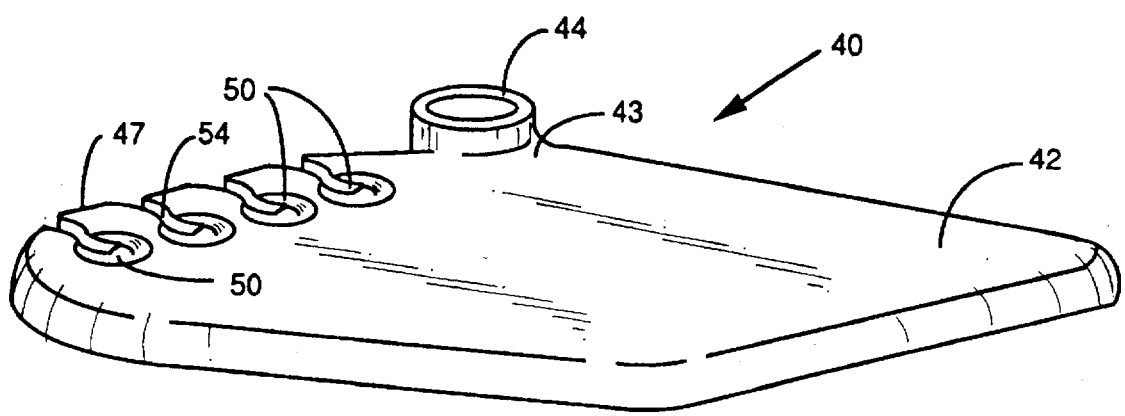
FIG. 2 is a front perspective view of the swing-out side table of the present invention.
Figure 3:
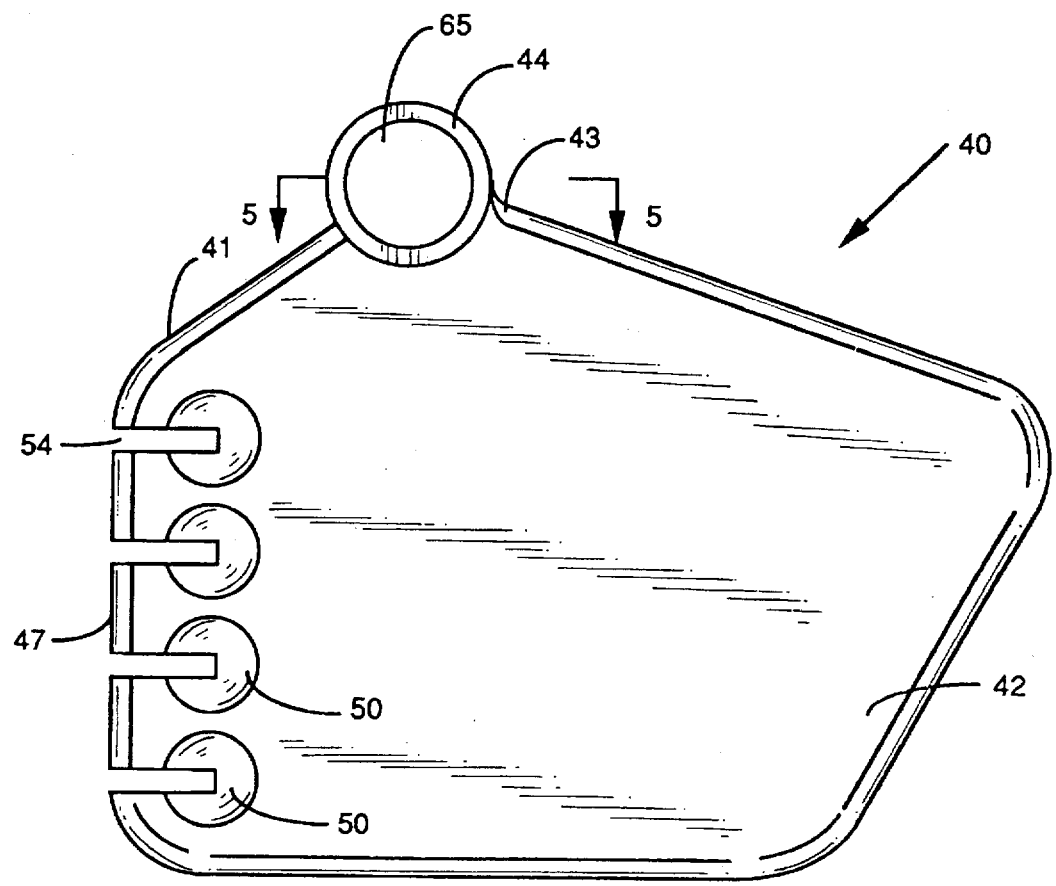
FIG. 3 is a top plan view of the swing-out side table of the present invention.

As shown in FIGS. 2 and 3, the swing-out side table 40 of the present invention comprises a table member 42 having a plurality of circular recesses 50 disposed along the side 47 of the table member 42. The recesses 50 surround open-ended slots or notches 54 in the side 47 for receiving and supporting cooking utensils such as spoons, forks, tongs and wire brushes, etc. The recesses 50 allow the user of the grill 10 to readily grasp the utensil supported in a given slot 54.

A collar 44 defining a circular opening 65 is integrally formed with, or may be otherwise disposed on, the side 43 of the table member 42 and comprises part of the means for rotatably supporting the side table 40 on a leg 11. In a preferred embodiment of the present invention, the collar 44 is circular to fit over one of the tubular legs 11, which is also of a circular cross-section. Preferably, the inside diameter of the collar 44 is only slightly larger than the outside diameter of the tubular legs 11 in order to provide a close fit between the two and to increase the force necessary to rotate the side table 40 about leg 11. In this manner, the swing-out side table 40 will not be easily knocked out of position when the grill 10 is rolled on its wheels or by people who may accidentally bump into the side table 40.

Figure 4:
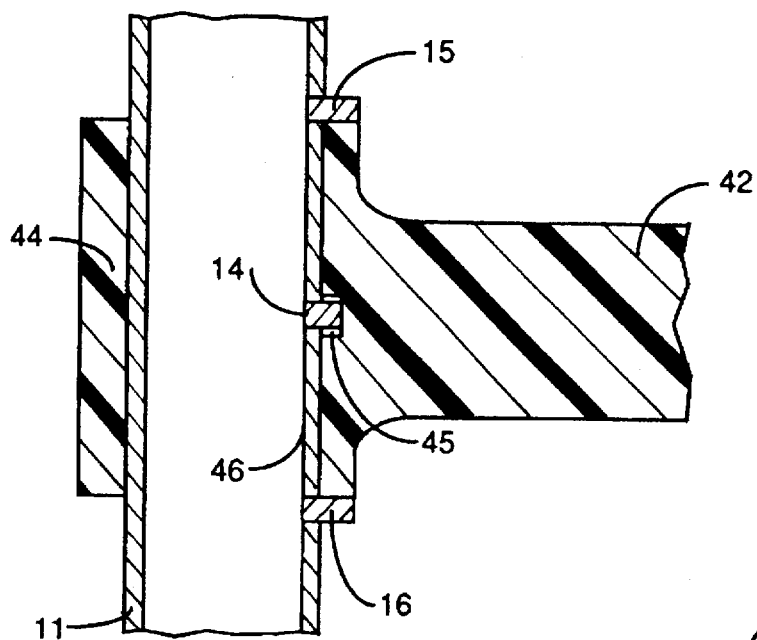
FIG. 4 is a partial cross-sectional view of the swing-out side table of the present invention along Line 4—4 of FIG. 1.
Figure 5:
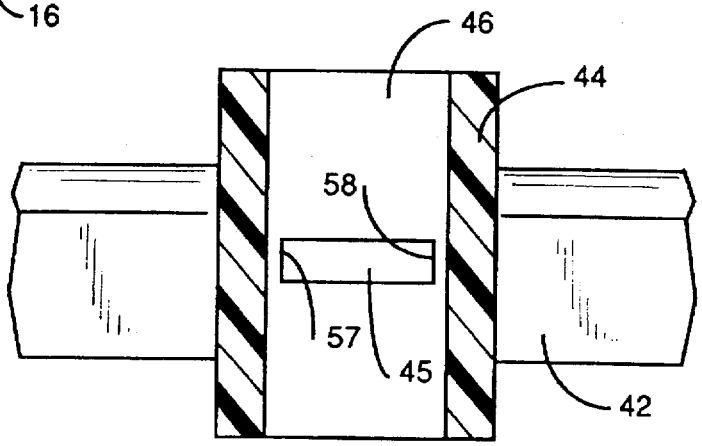
FIG. 5 is a partial cross-sectional view of the swing-out side table of the present invention along Line 5—5 of FIG. 3.

Additionally, means for restricting the rotational movement of the side table 40 to a predetermined angular range about leg 11 are also provided. Such means for restricting comprise an arcuate slot 45 as shown in FIGS. 4 and 5 in the inside surface 46 of collar 44 which receives the projection 14 disposed on leg 11. As seen in FIG. 5, the slot 45 is closed on both ends and stops the rotational movement of the side table 40 when projection 14 contacts either of the ends 57 or 58 of slot 45. Thus, the rotational movement of the side table 40 can be limited in this manner to any predetermined angular range, preferably from about 90 degrees to about 180 degrees. Such an angular range of movement allows the side table 40 to be rotated back and forth between its position shown in FIG. 1 and a position underneath the stationary side table 19 or even under the grill 10. The projection 14 in slot 45 combination also acts as a means for rotatably supporting side table 40 on leg 11 at the height of the projection 14. If a full 360 degrees of rotation of the side table 40 is desired where the projection also acts as the means for supporting the side table 40, then the slot 45 would continuously circumscribe the inner surface 46 of collar 44.

Other means for releasably securing the swing-out side table 40 against unwanted rotational movement at at least one angular position about leg 11, such as the angular position shown in FIG. 1, may also comprise a threaded hole or aperture (not shown) through the collar 44 for receiving a bolt which may be releasably secured against the leg 11. As is known in the art, the bolt may have a knob on one end which the user can use to screw the bolt into the threaded hole and against leg 11 to releasably fix the side table 40 in a desired angular position about leg 11.

Means for rotatably supporting the swing-out side table 40 at a desired height also include a lower projection 16 disposed below and in contact with the collar 44. Additionally, an upper projection 15 disposed above collar 44 may be provided to prevent the side table 40 from moving upward. Such projections 15, 16 may be spring-loaded or articulated in some other fashion to allow the user to remove the swing-out side table 40 from leg 11. In addition, several positions along the vertical length of leg 11 may be provided for receiving projections 14, 15 and 16 to allow the user to adjust the height of the side table 40. Alternatively, a plurality of spring-loaded, retractable detents (not shown) may be properly spaced along the vertical length of leg 11 to perform the functions of projections 14, 15 and 16 and provide a convenient means for adjusting the height of the swing-out side table 40.

Figure 6:
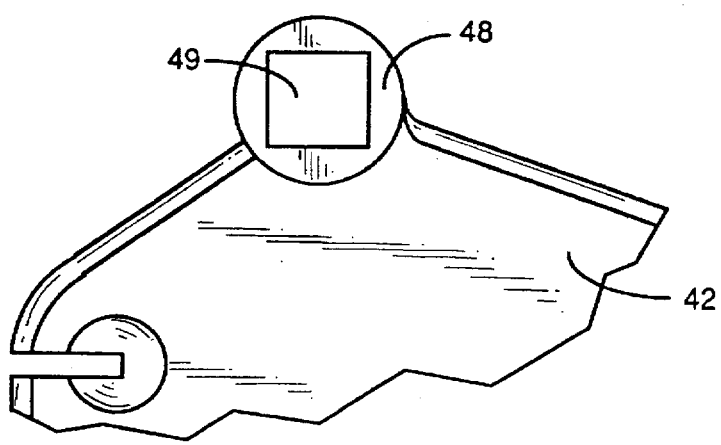
FIG. 6 is a partial top plan view of the swing-out side table of the present invention having a collar adapted to be fit over a grill leg of a square cross-section.

Another preferred embodiment of the swing-out side table 40 is shown in FIG. 6 in which the collar 48 has been modified to fit over a grill leg having a square cross-section. As shown, collar 48 has a square opening 49 which would be sized just larger than the cross-section of the leg on which side table 40 is to be mounted. The collar 48 is preferably made from a relatively soft material, such as plastic, and a self-lubricating plastic is even more preferred since such material would allow the collar 48 to be rotated more easily over a square leg. In this embodiment, projections 14, 15 and 16, or a combination thereof with or without a slot in the inside surface of collar 48, may be employed to rotatably support the side table 40. In addition, the same means set forth above for restricting the rotational movement of, and/or for releasably securing the side table 40 may be utilized in this preferred embodiment of the present invention.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

We claim:

1. A side table for a barbecue grill, comprising: a table member defining at least one depression adjacent a first side of said table member, said at least one depression surrounding at least a portion of an open slot in said first side of said table member for receiving and supporting a cooking utensil and means for rotatably supporting said table member on a vertical leg of said barbecue grill such that said table member is rotatable in horizontal plane about said vertical leg.

2. The side table of claim 1 further comprising means for releasably securing said side table against rotation in at least one angular position about said vertical leg.

3. The side table of claim 2 wherein said means for releasably securing comprises a threaded aperture in said collar for receiving a bolt which may be releasably secured against said leg.

4. The side table of claim 1 further comprising means for adjusting said side table between a plurality of positions along said leg.

5. A side table for a barbecue grill, comprising: a table member and means for rotatably supporting said table member on a vertical leg of said barbecue grill such that said table member is rotatable in horizontal plane about said vertical leg and means for restricting the rotational movement of said side table to a predetermined angular range about said vertical leg.

6. A side table for a barbecue grill, comprising: a table member and means for rotatably supporting said table member on a vertical leg of said barbecue grill such that said table member is rotatable in horizontal plane about said vertical leg and wherein said means for rotatably supporting comprises a collar disposed on a side of said table member, said collar having an inside diameter which is larger than an outside diameter of said leg which has a circular cross-section, and a slot in an inside surface of said collar for receiving a projection on said leg.

7. A side table for a barbecue grill, comprising: a table member and means for rotatably supporting said table member on a vertical leg of said barbecue grill such that said table member is rotatable in horizontal plane about said vertical leg and means for restricting the rotational movement of said side table to a predetermined angular range about said vertical leg comprising a slot having at least one closed end in an inside surface of said collar for receiving a projection on said leg.

8. A side table for a barbecue grill, comprising: a table member and means for rotatably supporting said table member on a vertical leg of said barbecue grill such that said table member is rotatable in horizontal plane about said vertical leg and wherein said means for supporting comprises a first projection on said leg disposed below and in contact with a collar disposed on a side of said table member, said collar having an inside diameter which is larger than an outside diameter of said leg which has a circular cross-section.

9. The side table of claim 8 wherein a second projection is disposed on said leg above said collar.

10. A side table for a barbecue grill, comprising: a table member and means for rotatably supporting said table member on a vertical leg of said barbecue grill such that said table member is rotatable in horizontal plane about said vertical leg, wherein said vertical leg has a polygonal cross-section and said means for supporting comprises a collar disposed on a first side of said table member, said collar defining an opening of the same polygonal shape as said cross-section of said leg but of a larger dimension, and a first projection on said leg disposed below and in contact with said collar.

11. A side table for a barbecue grill, comprising:

a table member having a plurality of spaced depressions adjacent a first side of said table member, each of said depressions surrounding at least a portion of a corresponding notch in said first side of said table member; and a collar disposed on a second side of said table, said collar defining an opening through which a leg of said grill may be extended, said collar having an inner surface defining a slot for receiving a projection on said leg.

12. The side table of claim 11 wherein said slot circumscribes said inner surface of said collar.

13. The side table of claim 11 wherein said slot has at least one closed end.

14. The side table of claim 11 wherein said slot has two closed ends.

* * * * *